(12) United States Patent
Kim et al.

(10) Patent No.: US 7,400,652 B2
(45) Date of Patent: Jul. 15, 2008

(54) MPEG-2 DECODING SYSTEM AND METHOD

(75) Inventors: Kwan-Lae Kim, Suwon-si (KR);
Sung-Jin Park, Suwon-si (KR); Jun-Ho Koh, Suwon-si (KR); Young-Seok Kim, Seongnam-si (KR); Yun-Je Oh, Yongin-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 742 days.

(21) Appl. No.: 10/861,205

(22) Filed: Jun. 4, 2004

(65) Prior Publication Data

US 2005/0163163 A1 Jul. 28, 2005

(30) Foreign Application Priority Data

Jan. 26, 2004 (KR) .................. 10-2004-0004679

(51) Int. Cl.
*H04H 20/28* (2008.01)
*H04H 11/02* (2006.01)

(52) U.S. Cl. .................. 370/486; 375/240.25

(58) Field of Classification Search .................. 370/486, 370/198, 531; 375/240.25, 240.26; 725/9, 725/38
See application file for complete search history.

(56) References Cited

U.S. PATENT DOCUMENTS

| | | | |
|---|---|---|---|
| 5,594,492 A * | 1/1997 | O'Callaghan et al. | 725/151 |
| 5,600,378 A * | 2/1997 | Wasilewski | 348/468 |
| 5,959,659 A * | 9/1999 | Dokic | 725/152 |
| 6,157,673 A * | 12/2000 | Cuccia | 375/240 |
| 6,215,530 B1 * | 4/2001 | Wasilewski | 348/731 |
| 2003/0101448 A1 * | 5/2003 | Kim | 725/9 |
| 2005/0172314 A1 * | 8/2005 | Krakora et al. | 725/38 |

FOREIGN PATENT DOCUMENTS

| | | |
|---|---|---|
| KR | 2000-505988 | 7/1998 |
| KR | 11-275476 | 10/1999 |

* cited by examiner

*Primary Examiner*—Seema S. Rao
*Assistant Examiner*—Mon Cheri S Davenport
(74) *Attorney, Agent, or Firm*—Cha & Reiter, LLC

(57) ABSTRACT

In an MPEG-2 decoding system, a transport decoder decodes a transport packet corresponding to a Program Identification (PID) from an input transport stream, and retrieves a Program Association Table/Program Map Table PAT/PMT) from the stream when it is requested to retrieve Program Specific Information (PSI). A pre-decoder checks PSI stored in a PSI memory in response to a request to change to a desired channnel, reads PIDs of transport packets for a Packetized Elementary Stream (PES) of a program corresponding to the desired channel from the PSI memory to provide it to the transport decoder, receives the PAT/PMT and updates the contents of the memory using the PAT/PMT. After decoding, PSI previously extracted therefrom is stored in the memory. PIDs of transport packets for the PES of desired program are obtained referring to the stored PSI, and transport packets having the PIDs are retrieved and decoded.

6 Claims, 6 Drawing Sheets

MPEG-2 DECODING SYSTEM AND METHOD

CLAIM OF PRIORITY

This application claims priority to an application entitled "MPEG-2 DECODING SYSTEM AND METHOD," filed in the Korean Intellectual Property Office on Jan. 26, 2004 and assigned Serial No. 2004-4679, the contents of which are hereby incorporated by reference.

BACKGROUND OF THE INVENTION

1. Field of the Invention

The present invention relates to a technique for decoding a multiple Moving Picture Experts Group-2 (MPEG-2) encoded Transport Stream (TS), and more particularly to an MPEG-2 decoding system and method for extracting Program Specific Information (PSI) from a transport stream in order to effectuate a channel change.

2. Description of the Related Art

An MPEG-2 system handles two kinds of multiplexed bit streams: a program stream and a transport stream. The program stream is used in a multiplexing scheme where a single broadcast program, including video, audio and captioning data, is transmitted in an error-free channel environment, or when an error correction function of a medium such as a CD is utilized without any alteration thereof. The transport stream is used in a multiplexing scheme where a number of broadcast programs are simultaneously transmitted in a channel environment where there is an error. For example, the program stream is used when storing a single program of a video CD or the like, whereas the transport stream is used when performing digital broadcasting of a plurality of programs using a satellite.

The MPEG-2 system incorporates a packet multiplexing scheme according to a Time Division Multiplexing system. In the packet multiplexing scheme, each of video and audio bit streams is first divided into so-called Packetized Elementary Stream (PES) packets of suitable lengths. The PES packets have an upper size limit of 64 KB to cope with various applications, and each packet size may be fixed or variable. A variable transfer rate and discontinuous transmission are also allowed for the PES packets. The PES packets are multiplexed into a single bit stream to produce the program or transport stream described above.

The packet size highly depends on a transmission channel or medium. For example, 53-byte packets (cells) are used in an ATM (Asynchronous Transfer Mode) protocol in Broadband Integrated Services Digital Networks (BISDN). A header in such a packet, containing basic information thereof, is 5 bytes, and thus an actual payload is 48 bytes. The transport stream packet (hereinafter abbreviated to a "transport packet") has a fixed size of 188 bytes in an ATM system. The first 4 bytes of the transport packet includes a header information, and the remaining 184 bytes includes a payload carrying video or audio data. The transport packet is transmitted while being carried in 4 ATM cells. If one byte of the 48 payload bytes of each ATM cell is used for an ATM Adaptation Layer (AAL), the actual payload is 47 bytes.

In operation, each broadcast station multiplexes and outputs transport packets. Multiplexed transport packets from a number of broadcast stations are then multiplexed into a single bit stream for a subsequent transmission via a single repeater. Digital satellite broadcasting employs a multiplexing scheme using Time Division Multiplexing (TDM) and Frequency Division Multiplexing (FDM) protocols. Each repeater has a bandwidth of 27 MHz and is operated according to the FDM scheme, and multiple broadcast stations may share a single repeater. A transport stream carried by each repeater is subjected to Reed Solomon coding and convolution coding for error correction, and transmission thereof between a satellite and the ground is performed through Quadrature Phase Shift Keying (QPSK) modulation.

At the receiving end, the reverse procedure of that described above is performed when a received transport stream is decoded. First, a repeater carrying a broadcast signal to be received is selected, and then QPSK-demodulation and error correction are performed on the broadcast signal. The resulting signal is a bit stream into which a number of broadcast signals are multiplexed. Thus, only transport packets of a broadcast station to be received are first selected from the multiplexed bit stream, and video and audio packets thereof are decoded by the video and audio decoders in order to reproduce image and audio signals, respectively.

As described in the International Standard Organization/ International Electro-technical Commission (ISO/IEC) 13818, the decoding system includes an elementary stream decoder, including at least one MPEG-2 audio decoder and at least one MPEG-2 video decoder, and an MPEG-2 transport decoder. The decoding system receives MPEG-2 transport streams (bit streams) from a number of service providers (that may have various source types). All the MPEG-2 transport streams may contain a number of programs that can be displayed to users. Thus, switching (i.e., channel change) from one program (or channel) to another program requires switching from one transport stream source to another transport stream source.

If a desired channel exists in a transport stream received by the decoding system, a latency between selection of a new channel and display of the desired channel is influenced based on the time it takes to resynchronize the data of the new channel by the elementary stream decoder and the transport decoder. However, if data of the desired channel does not exist in the currently used transport stream, the desired data must be selected from another transport stream, thus further delaying the switching process. In this case, the transport stream inputted to a transport decoder must be switched to a new transport stream. To parse and decode a program from the new transport stream, the transport decoder must first check Program Specific Information (PSI). Such an operation worsens the latency associated with the channel change, thereby making it difficult to smoothly provide broadcasting services such as digital broadcasting services to users.

SUMMARY OF THE INVENTION

Therefore, the present invention has been made in view of the above problem and provides additional advantages, by providing an MPEG-2 decoding system and a method capable of shortening the latency involved during changing of channels.

In accordance with one aspect of the present invention, an MPEG-2 decoding system includes a transport decoder for decoding a transport packet corresponding to a given PID (Program Identification) in a transport stream inputted thereto and retrieving a PAT/PMT (Program Association Table/Program Map Table) from said transport stream inputted thereto when a request to retrieve PSI (Program Specific Information) is made; a PSI memory for storing PSI; and a predecoder for i) checking the PSI stored in the PSI memory if a request to change to a desired channel is made, ii) reading a PID of a transport packet for an elementary stream of a program corresponding to the desired channel from the PSI memory, iii) providing the read PID to the transport decoder, iv) receiving the PAT/PMT from the transport decoder at a predetermined time, and v) updating contents of the PSI memory using the received PAT/PMT.

In accordance with another aspect of the present invention, an MPEG-2 decoding method includes the steps of a) extracting PSI from a transport stream and previously storing the extracted PSI; b) if a request to change to a desired channel is made, referring to the previously stored PSI to obtain a PID of a transport packet for an elementary stream of a program corresponding to the desired channel; and c) retrieving and decoding a transport packet corresponding to the obtained PID.

BRIEF DESCRIPTION OF THE DRAWINGS

The above features and other advantages of the present invention will be more clearly understood from the following detailed description taken in conjunction with the accompanying drawings, in which.

DETAILED DESCRIPTION

Figure 1:
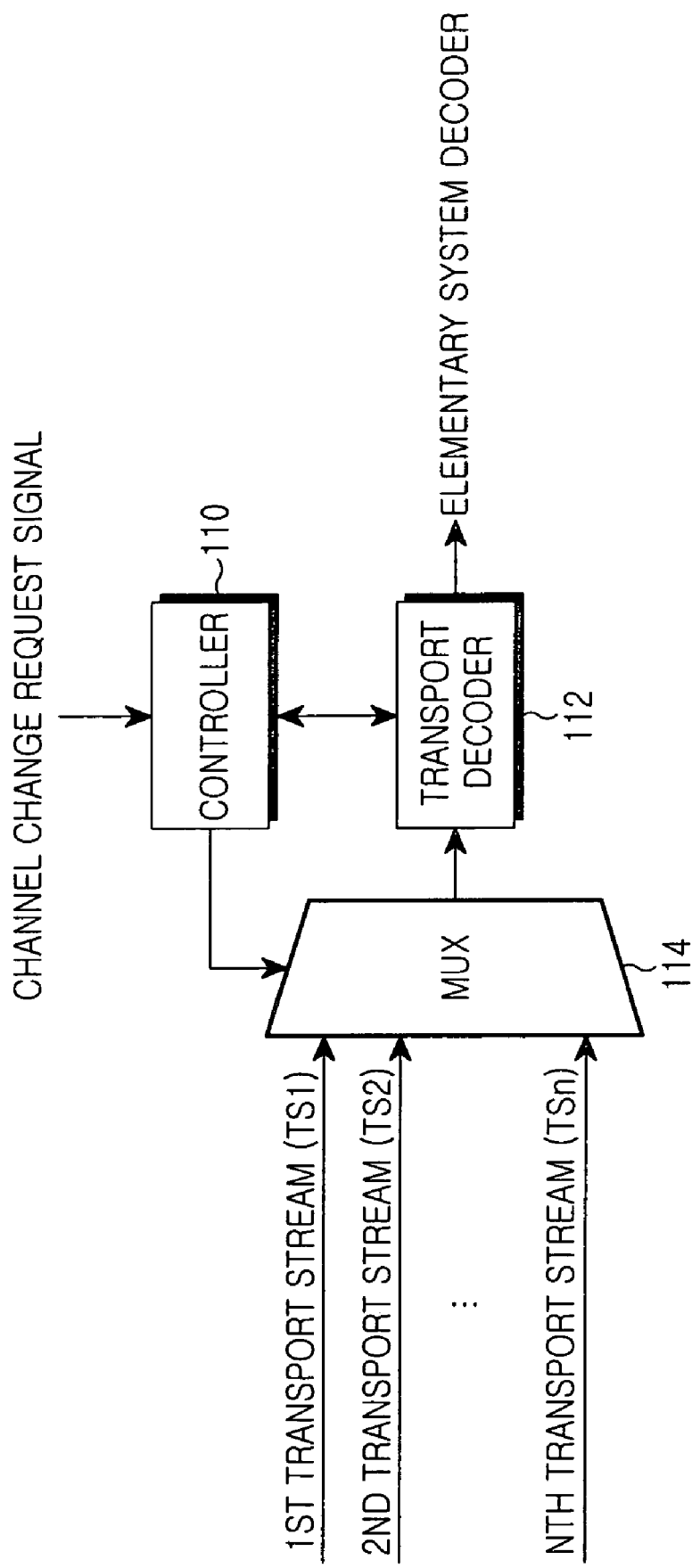
FIG. 1 is a schematic block diagram showing the components of a general MPEG-2 decoding system.

FIG. 1 is a schematic block diagram showing the components of a general MPEG-2 decoding system for decoding multiple MPEG-2 transport streams TS1 to TSn (ISO/IEC 13818-1 bit streams). According to the MPEG-2 standard (ISO/IES 13818), the decoding system includes a transport decoder 112 having an output coupled to an elementary stream decoder (not shown), which includes at least one MPEG-2 audio decoder and at least one MPEG-2 video decoder. The transport streams TS1 to TSn are provided by a modem, an ATM network, a digital storage medium, and different service providers.

The transport streams TS1 to TSn are provided to a multiplexer (MUX) 114 through bit stream inputs thereof, respectively. The multiplexer 114 selects one of the transport streams TS1 to TSn according to a control signal inputted to the multiplexer 114 and provides the selected transport stream to the transport decoder 112. The control signal is provided from a controller 110 which maps the channel numbers to transport stream sources. The controller 110 is activated in response to a channel change request signal provided from a user interface (not shown).

In operation, if data of a desired channel, to which the current channel is to be changed, exists in a transport stream currently inputted to the transport decoder 112, no change is made to the signal connection state of the multiplexer 114. However, if the data of the desired channel exists in a different transport stream, the controller 110 outputs a suitable control signal to enable the multiplexer 114 to have a different signal connection state, so that a new transport stream, to which the current transport stream is to be changed, is inputted to the transport decoder 112. To this end, the decoding system has to extract Program Specific Information (PSI) from the new transport stream inputted to the transport decoder 112. The packet structure of a transport stream will now be described with reference to the drawings to explain the time delay and the extraction of the PSI.

Figure 3:
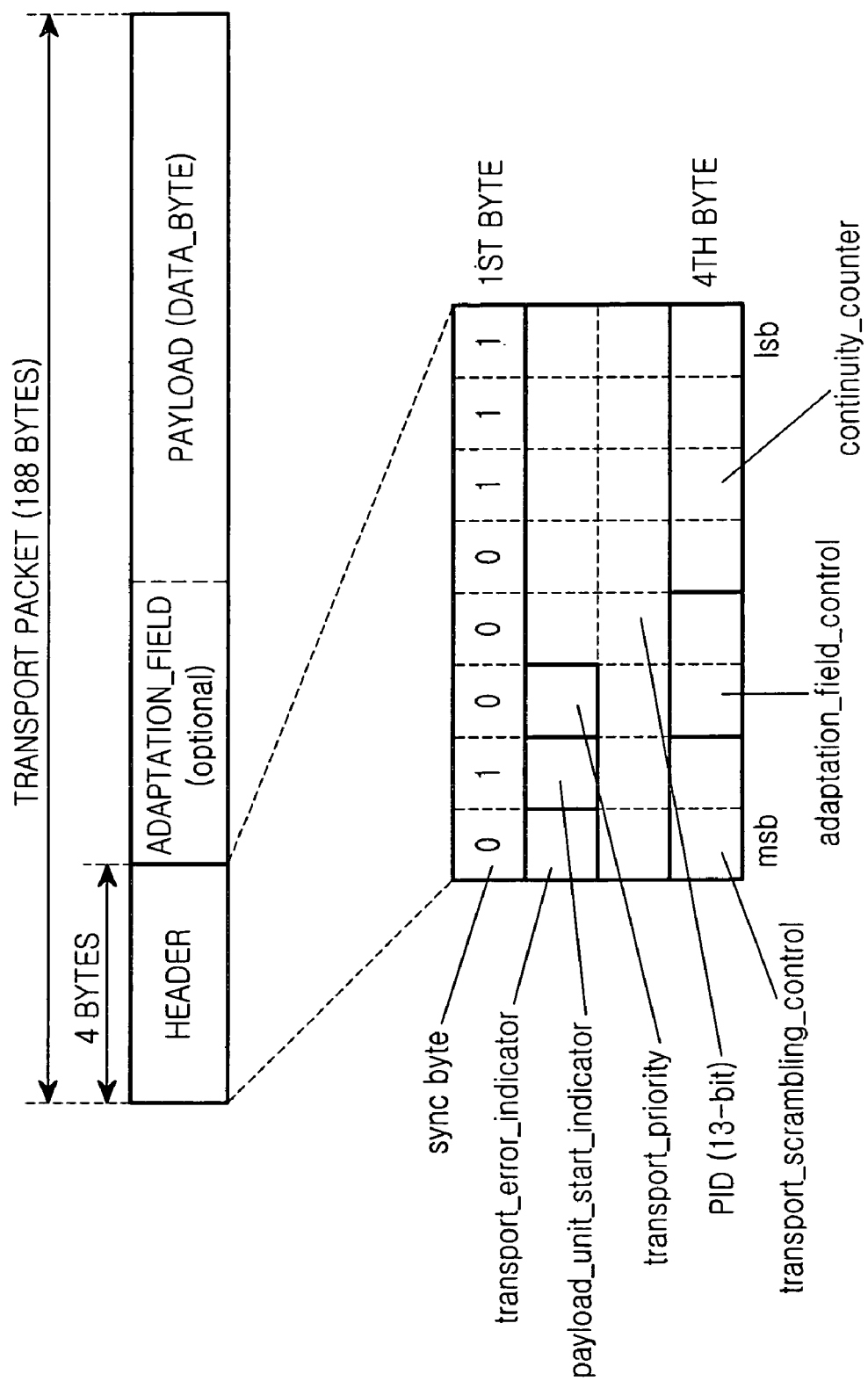
FIG. 3 shows a general format of a transport packet in a transport stream.
Figure 4:
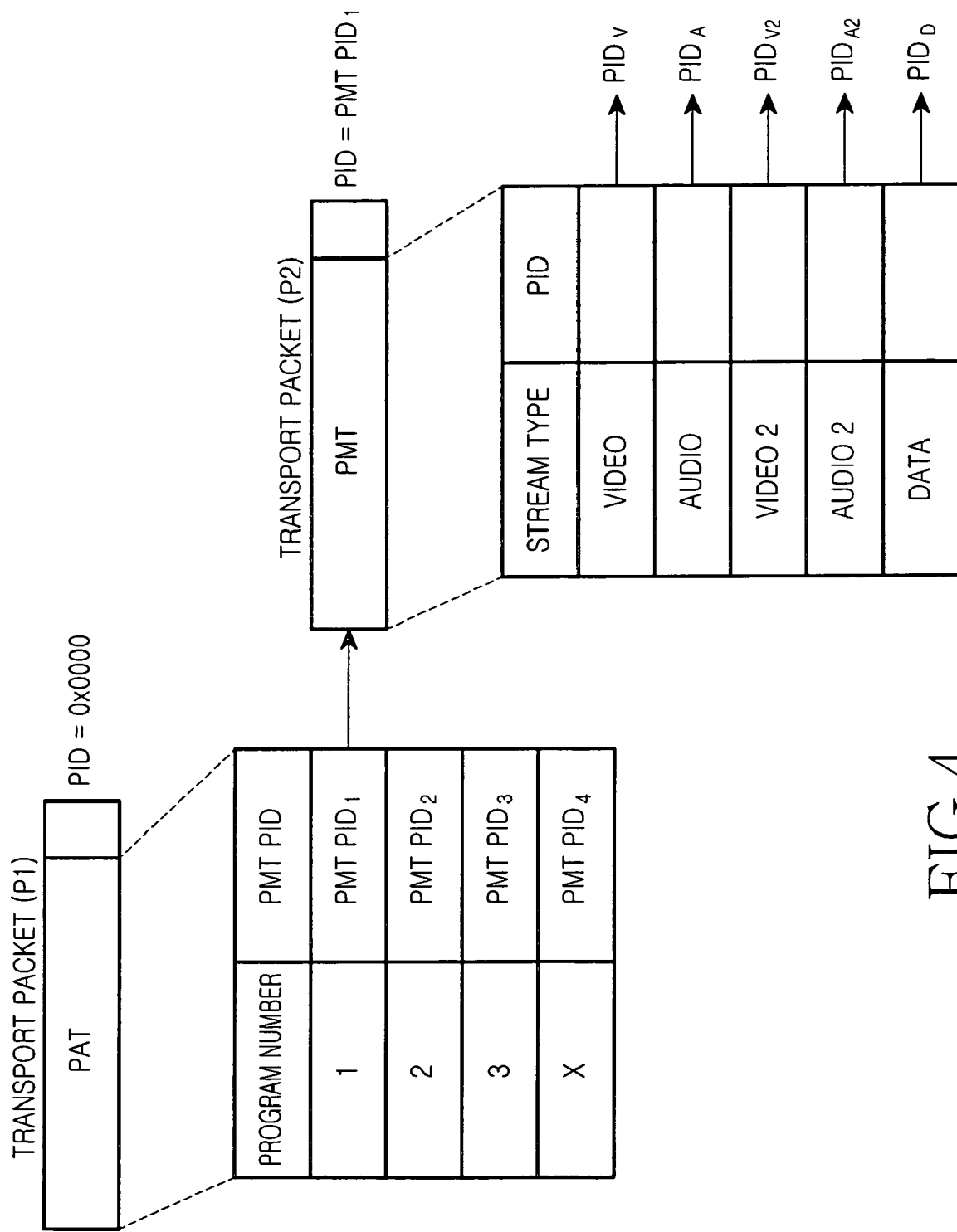
FIG. 4 shows an exemplary format of each of a transport packet including a Program Association Table (PAT) and a transport packet including a specific Program Map Table (PMT) according to an embodiment of the present invention.

FIG. 3 shows a general format of a transport packet in a transport stream, and FIG. 4 shows an exemplary format of each transport packet including a Program Association Table (PAT) and a transport packet including a specific Program Map Table (PMT) according to an embodiment of the present invention. First, as shown in FIG. 3, each transport packet in an MPEG-2 transport stream is 188 bytes and includes a packet header and a packet payload. The packet header is 4 bytes, and the packet payload is 184 bytes if there is no adaptation field therein. The header includes a Program Identification (PID) of 13 bits.

Each packet, including data of a stream corresponding to a desired channel, will have a unique PID. However, the transport decoder 112 cannot recognize a required PID that must be read from a newly inputted transport stream. To recognize the PID, the transport decoder 112 must first extract and confirm Program Specific Information (PSI) from the transport stream. In other words, the transport decoder 112 must wait for a transport packet (PID=0x000) P1 including a PAT. The PAT contains information indicating transport packets including PMTs (one for each program) and respective PIDs of the PMT packets. Each PMT includes information indicating which transport packets carry video and audio bit streams of a corresponding program. That is, each PMT includes the PIDs of transport packets in which a corresponding program is carried.

The transport decoder 112 first waits for a transport packet P1 including a PAT, and then receives and parses the transport packet P1. Thereafter, the transport decoder 112 confirms a PID ("PMT $PID_1$," in the example of FIG. 4) of a transport packet which includes a PMT for a desired program (whose program number is "1" in the example of FIG. 4), and then waits for a transport packet P2 having the confirmed PID. Subsequently, the transport decoder 112 reads the transport packet P2 including the PMT for the desired program to confirm PIDs of transport packets for the desired program. Finally, the transport decoder 112 recognizes transport packets having the confirmed PIDs for a Packetized Elementary Stream (PES) corresponding to the desired program and transfers the recognized transport packets to the elementary stream decoder.

Figure 5:
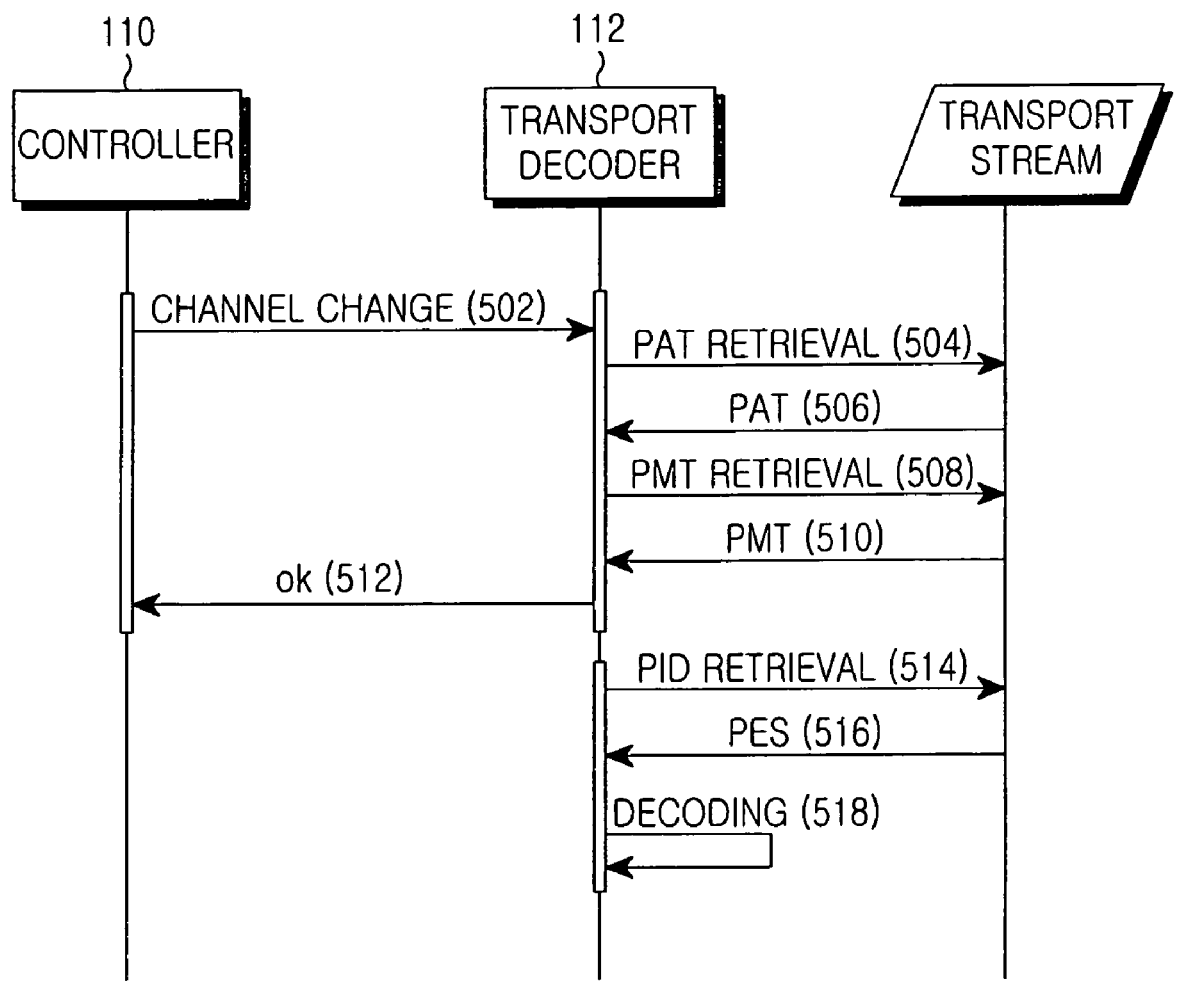
FIG. 5 is a process flow diagram showing how a general MPEG-2 decoding system operates to change channels.

FIG. 5 is a process flow diagram showing the operation steps of changing channel in a general MPEG-2 decoding system. First, in response to a channel change request signal from a user interface (not shown), a controller 110 instructs, at step 502, a transport decoder 112 to change channels. Upon receipt of the instruction, at step 504, the transport decoder 112 retrieves a transport packet including a PAT from a transport stream inputted thereto. Then, at step 506, if the transport decoder 112 has confirmed the transport packet including the PAT in the transport stream, it confirms the PID of a transport packet including a suitable PMT (corresponding to a desired program) in the confirmed PAT and retrieves the transport packet including the PMT from the transport stream at step 508. Thereafter, at step 510, if the transport decoder 112 has confirmed the transport packet including the PMT in the transport stream, it reads (or confirms) the PIDs of transport packets for a PES corresponding to the desired program from the PMT. Thereafter, at step 512, the transport decoder 112 informs the controller 110 of the completion of the channel change. Lastly, at steps 514 and 516, the transport decoder 112 retrieves and reads the transport packets of the desired program, which have the PIDs of the corresponding elementary stream (PES), from the transport stream, after which the transport decoder 112 performs a corresponding decoding operation at step 518.

As described above, when a request to change a channel is made, it is first required to confirm the transport packets including a PAT and a PMT. This causes a delay for completing the confirmation of such transport packets. In addition, each of the PAT and PMT may not be included in a specific transport packet. In most cases, each of the PAT and PMT is recorded in a number of transport packets. Further, transport packets including parts of the PAT and PMT may not reach the transport decoder continuously but distributed discontinuously in a number of different transport packets. Thus, the confirmation of the PAT and PMT may cause even a further significant delay (for example, a delay of several seconds).

Figure 2:
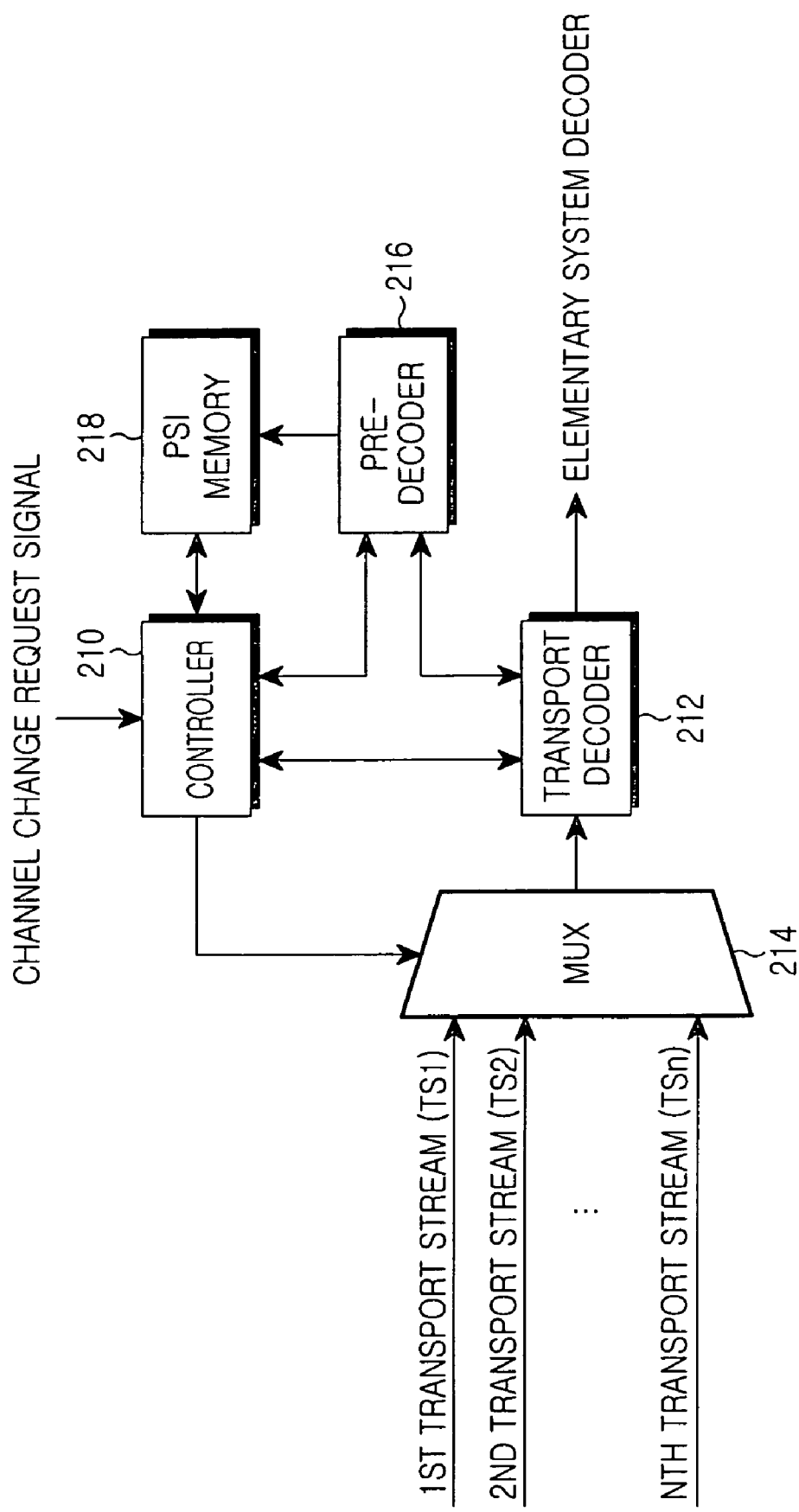
FIG. 2 is a schematic block diagram showing the components of an MPEG-2 decoding system according to an embodiment of the present invention.

FIG. 2 is a schematic block diagram showing the components of an MPEG-2 decoding system according to an embodiment of the present invention. The inventive system is configured to reduce a time delay required to obtain the PSI for realizing a channel change from a transport stream. As shown, MPEG-2 transport streams TS1 to TSn are provided to a multiplexer (MUX) 214 through bit stream inputs thereof, respectively. The multiplexer 214 selects one of the transport streams TS1 to TSn according to a control signal inputted thereto and provides the selected transport stream to a transport decoder 212. The control signal is provided from a controller 210, which maps channel numbers to transport stream sources. The controller 210 is activated in response to a channel change request signal provided from a user interface (not shown). In an alternate embodiment, the multiplexer 214 may be replaced with a cross point switch or the like.

The decoding system further includes a pre-decoder 216 and a PSI memory 218. The PSI memory 218 has a prerecorded PSI. When a request to change a current channel to a desired channel is received, the pre-decoder 216 receives a signal requesting channel change from the controller 210 (or directly from the user interface or the like) and confirms the PSI stored in the PSI memory 218, and then provides PIDs for a Packetized Elementary Stream (PES) corresponding to a desired program to the transport decoder 212. Alternatively, the pre-decoder 216 is configured to receive the PSI from the transport decoder 212 at a predetermined time period to store it in the PSI memory 218 in order to update the PSI stored previously therein.

In the decoding system according to the present invention configured as described above, the pre-decoder 216 first refers to the PSI (i.e., PMTs) stored in the PSI memory 218 to obtain PIDs of transport packets for a PES corresponding to the desired program in response to the channel change request. The pre-decoder 216 provides the PIDs obtained from the PSI memory 218 to the transport decoder 212, and then the transport decoder 212 retrieves and decodes transport packets having the same PIDs from a transport stream inputted to the transport decoder 212.

If the transport decoder 212 cannot retrieve the transport packets having the same PIDs from the transport stream, the transport decoder 212 informs the pre-decoder 216 thereof, so that the pre-decoder 216 can update the PSI (PAT/PMT). Here, the transport decoder 212 functions to retrieve a PAT and PMTs from transport packets of a transport stream inputted thereto and provide them to the pre-decoder 216. Based on the PAT/PMT information from the transport decoder 212, the pre-decoder 216 updates contents of the PSI memory 218. The transport decoder 212 may provide the PAT/PMT information to the pre-decoder 216 at intervals of a suitable preset period, irrespective of the channel change request by the user, and the pre-decoder 216 may update the contents of the PSI memory 218 on the basis of the information from the transport decoder 212.

Figure 6:
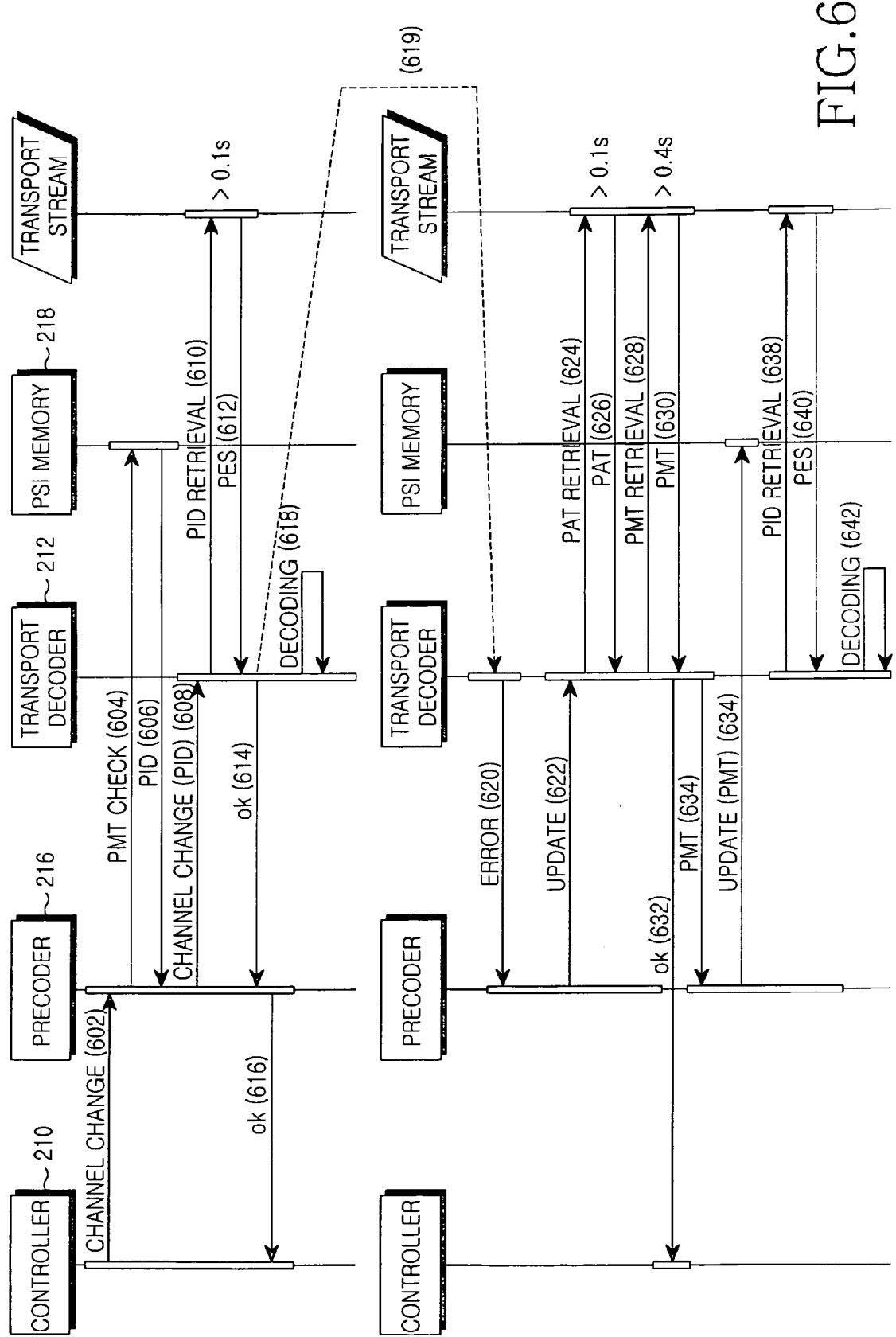
FIG. 6 is a process flow diagram showing how an MPEG-2 decoding system operates to change channels according to an embodiment of the present invention.

FIG. 6 is a flow diagram showing the operation steps of an MPEG-2 decoding system according to an embodiment of the present invention. As shown, in response to a channel change request signal provided from a user interface (not shown), a controller 210 first instructs a pre-decoder 216 to change the current channel to a desired channel at step 602. Upon receipt of the instruction, at steps 604 and 606, the pre-decoder 216 confirms a PMT stored in a PSI memory 218 to obtain PIDs of transport packets corresponding to the desired program. At step 608, the pre-decoder 216 provides the PIDs obtained from the PSI memory 218 to a transport decoder 212 to inform the transport decoder 212 of the channel change request. Accordingly, at steps 610 and 612, the transport decoder 212 retrieves and reads transport packets having the PIDs for a PES corresponding to the desired program from a transport stream inputted thereto. Then, at step 614, the transport decoder 212 transmits a signal for informing that the channel change has been completed to the pre-decoder 216, and then performs a decoding operation at step 618. If the channel change completion signal is received by the pre-decoder in step 614, the pre-decoder 216 informs the controller 210 of the same channel change completion at step 616.

Meanwhile, if it is not possible for the transport decoder 212 to retrieve the transport packets corresponding to the PIDs, obtained from the PSI memory 218, from the transport stream inputted thereto at steps 610 and 612, the transport decoder 212 confirms the impossibility at step 619, and then transmits an error signal to the pre-decoder 216 at step 620. Upon receipt of the error signal, the pre-decoder 216 outputs a PSI update request signal to the transport decoder 212 at step 622. Upon receipt of the PSI update request signal, the transport decoder 212 retrieves (or searches for) a transport packet including a PAT from a transport stream inputted thereto at step 624. Then, if the transport decoder 212 has confirmed the transport packet including the PAT from the transport stream at step 626, the transport decoder 212 confirms a PID of a transport packet including a suitable PMT (for example, a PMT corresponding to the desired program) in the confirmed PAT. Then, at step 628, the transport decoder 212 retrieves the transport packet including the PMT from the transport stream. Thereafter, if the transport decoder 212 has confirmed the transport packet including the PMT from the transport stream at step 630, it transmits a channel change completion signal to the controller 210 at step 632, and transmits the PMT to the pre-decoder 216 at step 634.

At step 638, the transport decoder 212 finally confirms the PIDs of transport packets for a PES corresponding to the desired program, in the PMT. Thereafter, at steps 638 and 640, the transport decoder 212 retrieves and reads transport packets, which have the PIDs for the PES corresponding to the desired program, from the transport stream, and then performs a corresponding decoding operation. If the PMT from the transport decoder 212 is received in step 634, the pre-decoder 216 updates contents of the PSI memory 218 according to the received PMT at step 636.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the above embodiments, but defined by the accompanying claims as well as equivalents thereof.

What is claimed is:

1. An MPEG-2 decoding system comprising:
   a transport decoder for decoding a transport packet corresponding to a given PID (Program Identification) in a transport stream inputted thereto from a plurality of transport streams and retrieving a PAT/PMT (Program Association Table/Program Map Table) from said transport stream inputted thereto when it is requested to retrieve PSI (Program Specific Information);
   a PSI memory for storing PSI; and
   a pre-decoder directly in communication with said PSI memory and the transport decoder for i) checking the PSI stored in the PSI memory if a request to change to a desired channel is made, ii) reading a PID of a transport packet for an elementary stream of a program corresponding to the desired channel from the PSI memory, iii) providing the read PID) to the transport decoder, iv) receiving the PAT/PMT from the transport decoder at a predetermined time period, and v) updating contents of the PSI memory using the received PAT/PMT;
   wherein the pre-decoder only receives any of the plurality of transport streams input to the decoding system via the transport decoder.

2. The system according to claim 1, further comprising:
   switch means for providing a transport stream, selected from a plurality of transport streams inputted thereto according to a control signal, to the transport decoder; and
   a controller for mapping a channel number to a transport stream source and outputting the control signal to allow the switch means to select the transport stream in response to the channel change request.

3. An MPEG-2 decoding method comprising the steps of:
   a) extracting PSI from a transport stream by a transport decoder and storing the extracted PSI;
   b) if a request to change to a desired channel is made, referring to the previously stored PSI by a pre-decoder to obtain a PID of a transport packet for an elementary stream of a program corresponding to the desired channel; and
   c) retrieving and decoding a transport packet corresponding to the obtained PID.

4. The method according to claim 3, wherein if the transport packet cannot be retrieved at said step c), the method further comprises the steps of:
   d) extracting a PAT/PMT from the transport stream; and
   e) updating contents of the previously stored PSI, based on the extracted PAT/PMT.

5. The method according to claim 3, the further comprising the steps of:
   extracting a PAT/PMT from the transport stream at intervals of a predetermined period; and
   updating contents of the previously stored PSI based on the extracted PAT/PMT.

6. The method according to claim 4, further comprising the steps of:
   extracting a PAT/PMT from the transport stream at intervals of a predetermined period; and
   updating contents of the previously stored PSI based on the extracted PAT/PMT.

* * * * *